(12) United States Patent
Miyazawa et al.

(10) Patent No.: US 9,539,890 B2
(45) Date of Patent: Jan. 10, 2017

(54) VEHICLE DRIVE DEVICE

(71) Applicant: AISIN AW CO., LTD., Anjo-shi, Aichi-ken (JP)

(72) Inventors: Manabu Miyazawa, Anjo (JP); Tatsuyuki Uechi, Toyoake (JP); Tatsuya Kondo, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/780,135

(22) PCT Filed: Mar. 18, 2014

(86) PCT No.: PCT/JP2014/057306
§ 371 (c)(1),
(2) Date: Sep. 25, 2015

(87) PCT Pub. No.: WO2014/192376
PCT Pub. Date: Apr. 12, 2014

(65) Prior Publication Data
US 2016/0052380 A1  Feb. 25, 2016

(30) Foreign Application Priority Data

May 31, 2013 (JP) ................. 2013-116027
Jul. 19, 2013 (JP) ................. 2013-150988

(51) Int. Cl.
*B60K 6/22* (2007.10)
*B60K 6/40* (2007.10)
(Continued)

(52) U.S. Cl.
CPC . *B60K 6/22* (2013.01); *B60K 6/26* (2013.01); *B60K 6/36* (2013.01); *B60K 6/40* (2013.01);
(Continued)

(58) Field of Classification Search
CPC ............... B60K 6/22; B60K 6/26; B60K 6/36; B60K 6/40; B60K 6/405; B60K 6/48; B60K 6/54; B60K 17/04; B60L 11/14; B60L 15/2036; B60L 15/2054; B60L 2240/423; B60L 2240/443; B60L 2240/486; H02M 7/44; B60Y 2200/92; B60Y 2400/61; Y02T 10/6221; Y02T 10/645; Y02T 10/70; Y02T 10/7077; Y02T 10/7275; Y10S 903/904
See application file for complete search history.

(56) References Cited

U.S. PATENT DOCUMENTS

| 5,643,119 A | * | 7/1997 | Yamaguchi ............ B60K 6/365 180/65.235 |
| 6,118,237 A | | 9/2000 | Kikuchi et al. |

(Continued)

FOREIGN PATENT DOCUMENTS

| JP | 2000-023307 A | 1/2000 |
| JP | 2000-217205 A | 8/2000 |

(Continued)

OTHER PUBLICATIONS

U.S. Appl. No. 14/780,130, filed Sep. 25, 2015 in the name of Takahashi et al.

(Continued)

*Primary Examiner* — Hau Phan
*Assistant Examiner* — Jacob Meyer
(74) *Attorney, Agent, or Firm* — Oliff PLC

(57) ABSTRACT

A vehicle drive device including: an input member drivably coupled to an internal combustion engine; an output member drivably coupled to wheels; a single wheel drive rotary electric machine that transfers a drive force to the output member; a speed change mechanism provided in a power transfer path that connects between the wheel drive rotary (Continued)

electric machine and the output member; and an inverter device that controls the wheel drive rotary electric machine.

20 Claims, 7 Drawing Sheets

(51) Int. Cl.
| | |
|---|---|
| B60K 6/405 | (2007.10) |
| B60K 6/48 | (2007.10) |
| B60L 11/14 | (2006.01) |
| B60L 15/20 | (2006.01) |
| B60K 6/26 | (2007.10) |
| B60K 6/36 | (2007.10) |
| B60K 17/04 | (2006.01) |
| B60K 6/54 | (2007.10) |
| H02M 7/44 | (2006.01) |

(52) U.S. Cl.
CPC .............. B60K 6/405 (2013.01); B60K 6/48 (2013.01); B60K 6/54 (2013.01); B60K 17/04 (2013.01); B60L 11/14 (2013.01); B60L 15/2036 (2013.01); B60L 15/2054 (2013.01); H02M 7/44 (2013.01); B60L 2240/423 (2013.01); B60L 2240/443 (2013.01); B60L 2240/486 (2013.01); B60Y 2200/92 (2013.01); B60Y 2400/61 (2013.01); Y02T 10/6221 (2013.01); Y02T 10/645 (2013.01); Y02T 10/70 (2013.01); Y02T 10/7077 (2013.01); Y02T 10/7275 (2013.01); Y10S 903/904 (2013.01)

(56) References Cited

U.S. PATENT DOCUMENTS

| | | | | |
|---|---|---|---|---|
| 6,166,498 | A * | 12/2000 | Yamaguchi | B60K 6/26 180/65.235 |
| 6,575,865 | B2 * | 6/2003 | Takenaka | B60K 6/383 180/65.235 |
| 7,033,296 | B2 * | 4/2006 | Takenaka | B60K 6/26 475/5 |
| 7,207,187 | B2 * | 4/2007 | Funahashi | F01C 21/10 62/113 |
| 7,651,425 | B2 * | 1/2010 | Shimizu | B60K 6/26 475/5 |
| 7,786,640 | B2 * | 8/2010 | Sada | B60K 6/365 310/112 |
| 7,891,449 | B2 * | 2/2011 | Sanji | B60K 6/26 180/65.23 |
| 7,896,116 | B2 * | 3/2011 | Tatematsu | B60K 6/365 180/65.21 |
| 7,975,571 | B2 * | 7/2011 | Sanji | B60K 6/40 74/661 |
| 7,977,830 | B2 * | 7/2011 | Yoshida | H02K 5/225 310/52 |
| 8,074,753 | B2 * | 12/2011 | Tahara | B60K 6/26 180/65.21 |
| 8,154,160 | B2 * | 4/2012 | Kakuda | B60K 6/365 310/66 |
| 8,201,650 | B2 * | 6/2012 | Yoshida | H02K 11/01 180/65.22 |
| 8,344,566 | B2 * | 1/2013 | Koshida | B60K 6/26 310/85 |
| 8,444,518 | B2 * | 5/2013 | Tanae | B60K 6/405 475/5 |
| 8,448,541 | B2 * | 5/2013 | Kasuya | B60K 6/387 180/65.245 |
| 8,636,091 | B2 * | 1/2014 | Sanji | B60K 6/26 180/65.23 |
| 8,808,125 | B2 * | 8/2014 | Tsuchida | B60K 6/40 180/65.235 |
| 8,808,128 | B2 * | 8/2014 | Sada | B60K 6/40 475/151 |
| 8,813,896 | B2 * | 8/2014 | Littlefield | B60K 17/00 180/274 |
| 8,875,825 | B2 * | 11/2014 | Asakura | B60K 6/405 180/68.4 |
| 8,905,881 | B2 * | 12/2014 | Sada | B60K 6/40 475/5 |
| 8,905,885 | B2 * | 12/2014 | Yamamoto | B60K 6/405 180/65.235 |
| 9,018,807 | B2 * | 4/2015 | Ito | H02M 7/003 310/64 |
| 9,065,322 | B2 * | 6/2015 | Ito | H02K 5/225 |
| 9,096,186 | B2 * | 8/2015 | Iwata | H05K 5/0217 |
| 9,309,933 | B2 * | 4/2016 | Date | B60K 6/387 |
| 2001/0024997 | A1 * | 9/2001 | Sugano | B60K 6/543 477/2 |
| 2002/0060099 | A1 * | 5/2002 | Takenaka | B60K 6/365 180/65.1 |
| 2003/0200761 | A1 * | 10/2003 | Funahashi | F01C 21/10 62/228.4 |
| 2004/0226761 | A1 | 11/2004 | Takenaka et al. | |
| 2009/0023529 | A1 * | 1/2009 | Sanji | B60K 6/365 475/5 |
| 2009/0071784 | A1 | 3/2009 | Combs et al. | |
| 2009/0100965 | A1 * | 4/2009 | Sanji | B60K 6/26 74/606 R |
| 2009/0206709 | A1 | 8/2009 | Kakuda et al. | |
| 2009/0243443 | A1 * | 10/2009 | Aoki | H02K 11/048 310/68 D |
| 2009/0251018 | A1 * | 10/2009 | Koshida | B60K 6/26 310/89 |
| 2009/0267352 | A1 * | 10/2009 | Sada | B60K 6/365 290/1 A |
| 2010/0084206 | A1 | 4/2010 | Yoshida et al. | |
| 2010/0127586 | A1 | 5/2010 | Yoshida et al. | |
| 2011/0039649 | A1 * | 2/2011 | Tanae | B60K 6/365 475/5 |
| 2012/0090425 | A1 * | 4/2012 | Kasuya | B60K 6/387 74/661 |
| 2012/0242198 | A1 * | 9/2012 | Kasuya | H02K 7/083 310/68 B |
| 2012/0248909 | A1 * | 10/2012 | Ito | H02M 7/003 310/64 |
| 2012/0250384 | A1 * | 10/2012 | Ito | H02K 5/225 363/132 |
| 2013/0184111 | A1 * | 7/2013 | Tsuchida | B60K 6/40 475/5 |
| 2015/0251531 | A1 * | 9/2015 | Hotta | B60K 6/48 180/65.25 |
| 2015/0306949 | A1 * | 10/2015 | Ooki | B60K 6/40 74/665 R |
| 2016/0039276 | A1 | 2/2016 | Takahashi et al. | |
| 2016/0052380 | A1 | 2/2016 | Miyazawa et al. | |
| 2016/0072361 | A1 | 3/2016 | Kuramochi et al. | |

FOREIGN PATENT DOCUMENTS

| | | |
|---|---|---|
| JP | 2001-119898 A | 4/2001 |
| JP | 2001-187535 A | 7/2001 |
| JP | 2001-322439 A | 11/2001 |
| JP | 2002-120575 A | 4/2002 |
| JP | 2004-153897 A | 5/2004 |
| JP | 2004-215348 A | 7/2004 |
| JP | 2004-222354 A | 8/2004 |
| JP | 2004-343845 A | 12/2004 |
| JP | 2007-166803 A | 6/2007 |
| JP | 2008-290621 A | 12/2008 |
| JP | 2008-301572 A | 12/2008 |
| JP | 2009-101730 A | 5/2009 |
| JP | 2009-201218 A | 9/2009 |
| JP | 2011-067093 A | 3/2011 |
| JP | 2011-213230 A | 10/2011 |
| JP | 2012-065436 A | 3/2012 |
| JP | 2012-121549 A | 6/2012 |
| JP | 2012-162132 A | 8/2012 |

(56) References Cited

FOREIGN PATENT DOCUMENTS

| | | |
|---|---|---|
| JP | 2012-217263 A | 11/2012 |
| WO | 2009-104491 A1 | 8/2009 |
| WO | 2014/192376 A1 | 12/2014 |

OTHER PUBLICATIONS

U.S. Appl. No. 14/780,155, filed Sep. 25, 2015 in the name of Kuramochi et al.
U.S. Appl. No. 14/780,335, filed Sep. 25, 2015 in the name of Suzuki et al.

* cited by examiner

VEHICLE DRIVE DEVICE

BACKGROUND

The present disclosure relates to a vehicle drive device that includes an input member drivably coupled to an internal combustion engine, an output member drivably coupled to wheels, a single wheel drive rotary electric machine, a speed change mechanism, and an inverter device.

A device described in Japanese Patent Application Publication No. 2004-153897 is known as an example of the vehicle drive device described above. In the drive device, a wheel drive rotary electric machine [electric motor 8] and a speed change mechanism [automatic transmission 5] are disposed coaxially with a predetermined clearance between each other in the axial direction. An inverter device [inverter device 11] is disposed so as to overlap the wheel drive rotary electric machine as seen in the radial direction and with a part of the inverter device positioned between the wheel drive rotary electric machine and the speed change mechanism in the axial direction.

By disposing a part of the inverter device between the wheel drive rotary electric machine and the speed change mechanism in the axial direction in this way, it is possible to suppress an increase in radial dimension of the entire device. However, the wheel drive rotary electric machine, a part of the inverter device, and the speed change mechanism are arranged side by side in the axial direction, which increases the axial dimension of the entire device. It may be difficult to mount a vehicle drive device with a large axial dimension on a vehicle of a transverse mount type (a type in which the device is disposed with the axial direction of the device extending along the transverse direction of the vehicle), for example.

SUMMARY

In view of the foregoing, it is desirable to provide a vehicle drive device with excellent vehicle mountability.

The present disclosure according to an exemplary aspect provides a vehicle drive device including: an input member drivably coupled to an internal combustion engine; an output member drivably coupled to wheels; a single wheel drive rotary electric machine that transfers a drive force to the output member; a speed change mechanism provided in a power transfer path that connects between the wheel drive rotary electric machine and the output member; and an inverter device that controls the wheel drive rotary electric machine, in which: the input member, the wheel drive rotary electric machine, and the speed change mechanism are disposed coaxially and side by side in an axial direction; and the inverter device is disposed so as to overlap the speed change mechanism as seen in a radial direction and so as not to overlap the wheel drive rotary electric machine as seen in the radial direction.

In the present disclosure, the term "drivably coupled" means a state in which two rotary elements are coupled to each other in such a manner that enables transfer of a drive force (a synonym for torque). The concept includes a state in which the two rotary elements are coupled so as to rotate together with each other, and a state in which the two rotary elements are coupled via one or more transmission members in such a manner that enables transfer of a drive force. Such transmission members may include various members that transfer rotation at an equal speed or a changed speed (such as a shaft, a gear mechanism, and a belt), and include engagement devices that selectively transfer rotation and a drive force (such as a friction engagement device and a meshing-type engagement device).

The term "rotary electric machine" for driving wheels refers to any of a motor (electric motor), a generator (electric generator), and a motor generator that functions both as a motor and as a generator as necessary.

With regard to the arrangement of two members, the phrase "overlap each other as seen in a certain direction" means that when an imaginary line that is parallel to the viewing direction is moved in directions that are orthogonal to the imaginary line, the imaginary line crosses both of the two members in at least some region.

According to the characteristic configuration, the wheel drive rotary electric machine and the speed change mechanism are disposed side by side in the axial direction. Thus, the axial dimension can be reduced to be small compared to a case where another member is disposed between the wheel drive rotary electric machine and the speed change mechanism. In this event, the speed change mechanism is disposed on the side opposite to the input member and the internal combustion engine with respect to the wheel drive rotary electric machine, and disposed at a position spaced from the internal combustion engine compared to the wheel drive rotary electric machine. In the case where the vehicle mounted state is taken into consideration, in general, auxiliaries are disposed in the vicinity of the internal combustion engine in many cases. Thus, there tends to be a limitation on the installation space at a position closer to the internal combustion engine. In the characteristic configuration described above, in consideration of this respect, the inverter device is disposed so as to overlap the speed change mechanism without overlapping the wheel drive rotary electric machine as seen in the radial direction. With such a configuration, it is possible to effectively suppress an increase in radial dimension of a portion (on the outer side of the wheel drive rotary electric machine) at which there tends to be a limitation on the installation space in the vehicle mounted state in a configuration integrally including the inverter device, which achieves good vehicle mountability.

Preferable aspects of the present disclosure will be described below.

In one aspect, preferably, the speed change mechanism is formed to be smaller in the radial direction than the wheel drive rotary electric machine; and the inverter device is disposed on an outer side in the radial direction with respect to the speed change mechanism.

There is an extra arrangement space on the radially outer side of the speed change mechanism, which is smaller in diameter than the wheel drive rotary electric machine, compared to the radially outer side of the wheel drive rotary electric machine. Thus, it is easy to downsize the entire device in the radial direction by disposing the inverter device on the radially outer side of the speed change mechanism and at a position at which the inverter device overlaps the speed change mechanism as seen in the radial direction as in the configuration described above.

In one aspect, preferably, the vehicle drive device further includes a terminal block that includes a relay terminal for electrical connection between the inverter device and the wheel drive rotary electric machine; and the terminal block is disposed so as to overlap the speed change mechanism as seen in the radial direction and so as to overlap the wheel drive rotary electric machine as seen in the axial direction.

The amount of projection of the terminal block in the radial direction can be reduced to be small by disposing the terminal block so as to overlap the speed change mechanism as seen in the radial direction and so as to overlap the wheel drive rotary electric machine as seen in the axial direction. Hence, the radial dimension of the entire device can be effectively downsized.

In one aspect, preferably, the speed change mechanism is formed to be larger in length in the axial direction than the wheel drive rotary electric machine.

According to the configuration, it is easy to form the inverter device, which is disposed so as to overlap the speed change mechanism as seen in the radial direction, in a flat shape to be long in the axial direction and thin in the radial direction. Hence, the radial dimension of the entire device can be effectively downsized.

In one aspect, preferably, the vehicle drive device further includes a differential gear device provided in the power transfer path to distribute a drive force transferred from a side of the speed change mechanism to a plurality of output members, and a gear mechanism provided in the power transfer path and interposed between the speed change mechanism and the differential gear device; a rotational axis of the speed change mechanism, a rotational axis of the gear mechanism which is parallel to the axial direction, and a rotational axis of the differential gear device which is parallel to the axial direction are disposed at vertexes of a triangle as seen in the axial direction; in a vehicle mounted state, the gear mechanism is disposed such that an upper end portion of the gear mechanism is positioned above an upper end portion of the speed change mechanism; and in the vehicle mounted state, the terminal block is disposed so as to overlap the speed change mechanism as seen in a vertical direction and so as to overlap the gear mechanism as seen in a horizontal direction that is orthogonal to the axial direction.

In a configuration in which the respective rotational axes of the speed change mechanism, the gear mechanism, and the differential gear device are disposed in a triangular shape as seen in the axial direction, there tends to be a dead space on the radially outer side of the gear mechanism and on the radially outer side of the speed change mechanism. Thus, it is possible to suppress occurrence of a dead space inside the device effectively utilizing a region on the outer side of both the gear mechanism and the speed change mechanism by disposing the terminal block so as to overlap the speed change mechanism as seen in the vertical direction and so as to overlap the gear mechanism as seen in the horizontal direction in the vehicle mounted state. As a result, the entire device can be effectively downsized.

In one aspect, preferably, the inverter device includes at least a plurality of switching elements for DC/AC conversion.

According to the configuration, it is possible to appropriately configure the inverter device which controls the AC-driven wheel drive rotary electric machine which is suitable to drive the wheels.

In one aspect, preferably, the vehicle drive device further includes a case that accommodates the wheel drive rotary electric machine and the speed change mechanism; a damper accommodation case portion that accommodates a damper and that is formed to be larger in the radial direction than the case is provided between the case and the internal combustion engine; and in the vehicle mounted state, the inverter device is disposed such that an upper end portion of the inverter device is positioned below an upper end portion of the damper accommodation case portion.

In order to suppress torsional vibration of the internal combustion engine, the damper is occasionally provided between the input member and the internal combustion engine. In general, the damper is accommodated in the damper accommodation case portion which is provided between the case which accommodates the wheel drive rotary electric machine and the speed change mechanism and the internal combustion engine, and the damper accommodation case portion often occupies a larger region in the up and down direction than the case. For example, the upper end portion of the case (here, including the damper accommodation case portion) in the vehicle mounted state is prescribed by the upper end portion of the damper accommodation case portion in some cases. According to the configuration described above, it is possible to integrate the vehicle drive device and the inverter device with each other while avoiding an increase in size of the entire device in such cases.

DETAILED DESCRIPTION OF THE EMBODIMENTS

A vehicle drive device according to an embodiment of the present disclosure will be described with reference to the drawings. A vehicle drive device 1 according to the embodiment is a vehicle drive device (hybrid vehicle drive device) configured to drive a vehicle (hybrid vehicle) that includes both an internal combustion engine E and a rotary electric machine MG as drive force sources for wheels W. Specifically, the vehicle drive device 1 is constituted as a drive device for a one-motor parallel type hybrid vehicle. That is, the vehicle drive device 1 is constituted as a drive device for a parallel type hybrid vehicle that includes one rotary electric machine MG that functions as a drive force source for the wheels W. In the following description, terms related to the direction, the position, etc. of each member may allow a difference due to a manufacturing error. In addition, directions for each member indicate directions with that member assembled to the vehicle drive device 1.

1. Schematic Configuration of Vehicle Drive Device

Figure 1:
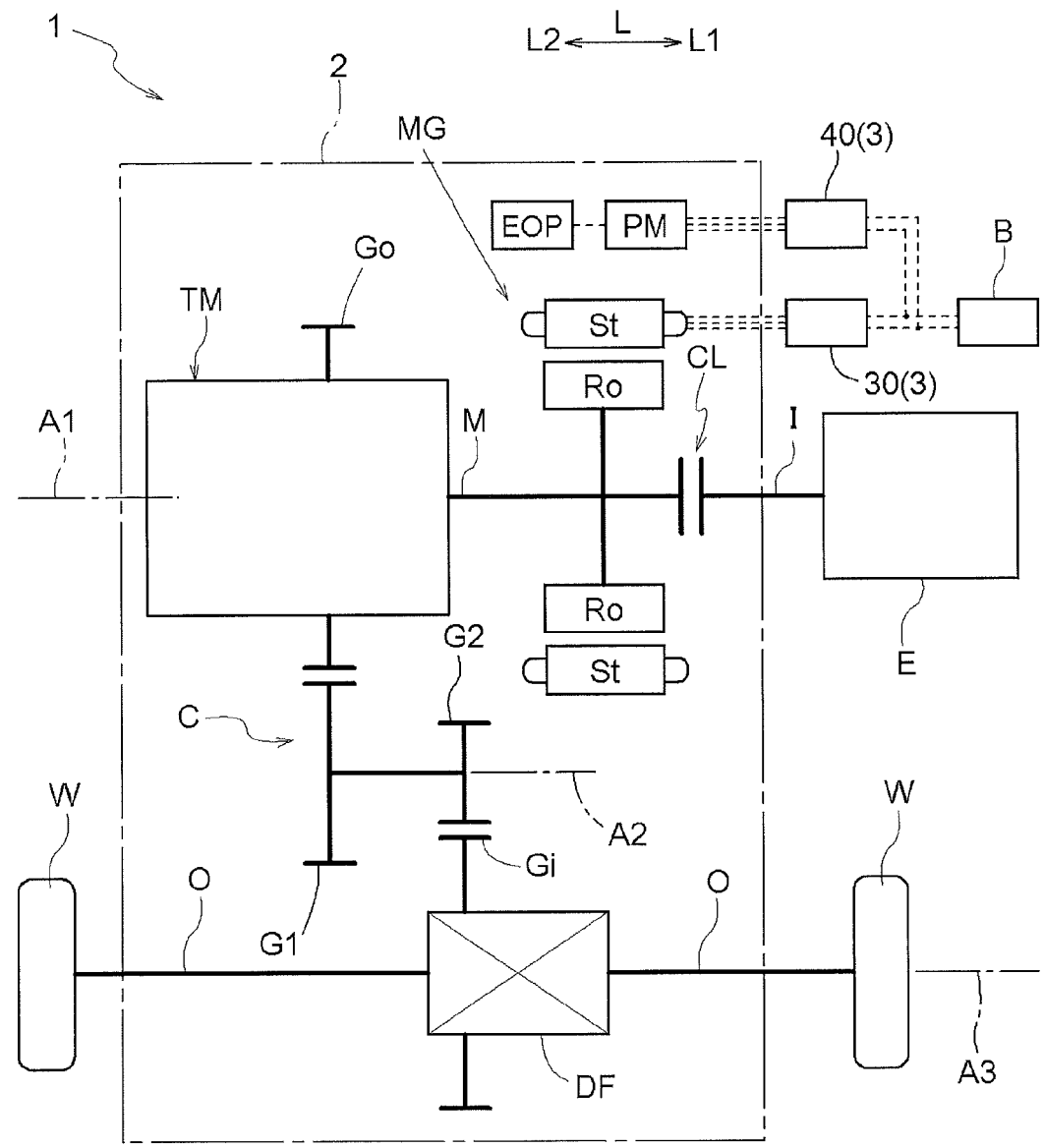
FIG. 1 is a schematic diagram illustrating a schematic configuration of a vehicle drive device.

As illustrated in FIG. 1, the vehicle drive device 1 includes an input shaft I drivably coupled to the internal combustion engine E, output shafts O drivably coupled to the wheels W, the rotary electric machine MG, and a speed change mechanism TM. In the embodiment, in addition, the vehicle drive device 1 also includes an engagement device CL, a gear mechanism C, and a differential gear device DF. The engagement device CL, the rotary electric machine MG, the speed change mechanism TM, the gear mechanism C, and the differential gear device DF are provided in a power transfer path that connects between the input shaft I and the output shafts O. Such components are provided in the order in which they are mentioned from the side of the input shaft I. In addition, such components are accommodated in a case (drive device case) 2. In the embodiment, the input shaft I corresponds to the "input member" according to the present disclosure, and the output shafts O correspond to the "output member" according to the present disclosure.

The input shaft I, the rotary electric machine MG, and the speed change mechanism TM are disposed on a first axis A1. That is, the input shaft I, the rotary electric machine MG, and the speed change mechanism TM are disposed side by side along the direction of extension of the first axis A1 with the first axis A1, which is an imaginary axis, as the rotational axis (also see FIG. 6). In addition, the gear mechanism C is disposed on a second axis A2. That is, the gear mechanism C is disposed along the direction of extension of the second axis A2 with the second axis A2, which is an imaginary axis, as the rotational axis. In addition, the differential gear device DF is disposed on a third axis A3. That is, the differential gear device DF is disposed along the direction of extension of the third axis A3 with the third axis A3, which is an imaginary axis, as the rotational axis. The three axes A1, A2, and A3 are disposed in parallel with each other. In the embodiment, the direction that is parallel to the three axes A1, A2, and A3 is defined as an "axial direction L". In addition, the direction in the axial direction L from the speed change mechanism TM side toward the input shaft I side (rightward in FIG. 1) is defined as a "first axial direction L1", and the direction in the axial direction L from the input shaft I side toward the speed change mechanism TM side (leftward in FIG. 1) is defined as a "second axial direction L2".

Figure 2:
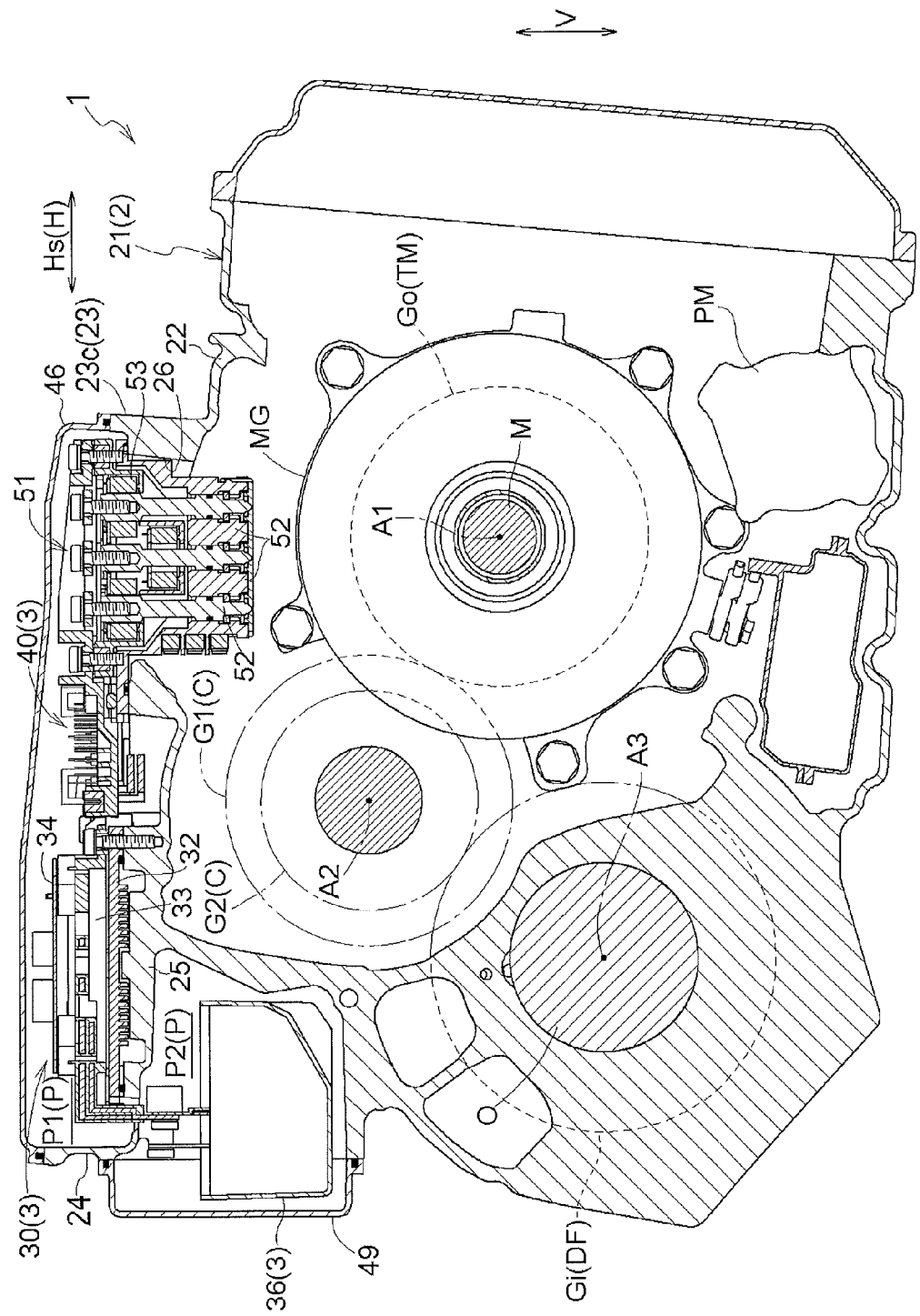
FIG. 2 illustrates the vehicle drive device as seen in the axial direction.

As illustrated in FIG. 2, the first axis A1, the second axis A2, and the third axis A3, which are separate axes, are disposed at different positions as seen in the axial direction L. In the embodiment, the first axis A1, the second axis A2, and the third axis A3 are disposed so as to be positioned at the vertexes of a triangle (in the example, an obtuse triangle) as seen in the axial direction L (i.e., the view of FIG. 2). In other words, the first axis A1, the second axis A2, and the third axis A3 are disposed such that imaginary lines that connect between the axes as seen in the axial direction L form a triangle. In the embodiment, in addition, in a vehicle mounted state (a state in which the vehicle drive device 1 is mounted on a vehicle) illustrated in FIG. 2, the second axis A2 is disposed above (on the upper side in a vertical direction V with respect to) the first axis A1 and the third axis A3. In the example, the gear mechanism C is disposed such that the upper end portion of the gear mechanism C is positioned above the upper end portion of the speed change mechanism TM and the upper end portion of the differential gear device DF. Such a vehicle drive device 1 with a multi-axis configuration is suitable to be mounted on Front Engine Front Drive (FF) vehicles, for example.

As illustrated in FIG. 1, the input shaft (drive device input shaft) I is drivably coupled to the internal combustion engine E. The internal combustion engine E is a motor (such as a gasoline engine or a diesel engine) driven by combusting fuel inside the engine to take out power. In the embodiment, the input member I is drivably coupled to an output shaft (such as a crankshaft) of the internal combustion engine E. The output shaft of the internal combustion engine E and the input shaft I may be drivably coupled to each other via a damper or the like.

The engagement device CL is provided in a power transfer path that connects between the input shaft I and the rotary electric machine MG. The engagement device CL selectively drivably couples the input shaft I (internal combustion engine E) and the rotary electric machine MG to each other. The engagement device CL functions as an internal combustion engine-disengaging engagement device that disengages the internal combustion engine E from the wheels W. In the embodiment, the engagement device CL is constituted as a hydraulically driven friction engagement device. The engagement device CL may be an electromagnetically driven friction engagement device, a meshing-type engagement device, or the like.

The rotary electric machine MG includes a stator St fixed to the case 2 and a rotor Ro supported on the radially inner side of the stator St so as to be freely rotatable. The rotary electric machine MG can function as a motor (electric motor) that is supplied with electric power to generate power and as a generator (electric generator) that is supplied with power to generate electric power. The rotary electric machine MG is electrically connected to an electricity accumulation device B (such as a battery or a capacitor) via a first inverter 30. The rotary electric machine MG is supplied with electric power from the electricity accumulation device B to perform power running, or supplies electric power generated using torque of the internal combustion engine E or an inertial force of the vehicle to the electricity accumulation device B to accumulate the electric power. The rotor Ro of the rotary electric machine MG is drivably coupled to an intermediate shaft M so as to rotate together with the intermediate shaft M. The intermediate shaft M serves as an input shaft of the speed change mechanism TM (transmission input shaft).

In the embodiment, the speed change mechanism TM is a stepped automatic transmission that includes a plurality of gear mechanisms and a plurality of shifting engagement devices to switchably provide a plurality of shift speeds with different speed ratios. An automatic continuously variable transmission with continuously variable speed ratios, a stepped manual transmission that switchably provides a plurality of shift speeds with different speed ratios, a fixed transmission that provides a single shift speed with a fixed speed ratio, or the like may also be used as the speed change mechanism TM. The speed change mechanism TM transfers rotation and torque input to the intermediate shaft M to a transmission output gear Go of the speed change mechanism TM with the speed changed at a speed ratio at each timing and with torque converted.

The transmission output gear Go is drivably coupled to the gear mechanism (counter gear mechanism) C. The gear mechanism C includes a first gear G1 and a second gear G2 each formed on a common shaft member. The first gear G1 meshes with the transmission output gear Go of the speed change mechanism TM. The second gear G2 meshes with a differential input gear Gi of the differential gear device DF. In the embodiment, the second gear G2 is disposed on the side in the first axial direction L1 (internal combustion engine E side) with respect to the first gear G1. The second gear G2 is formed to be smaller in diameter (have less teeth) than the first gear G1.

The differential gear device (output differential gear device) DF is drivably coupled to the wheels W via the output shafts O. The differential gear device DF includes the differential input gear Gi and a differential body portion (a body portion of the differential gear device DF) coupled to the differential input gear Gi. The differential body portion is configured to include a plurality of bevel gears that mesh with each other, and a differential case that accommodates the plurality of bevel gears, and plays a central role in a differential mechanism. The differential gear device DF distributes and transfers rotation and torque input from the rotary electric machine MG side to the differential input gear Gi via the speed change mechanism TM and the gear mechanism C to the two, left and right, output shafts O (that is, the two, left and right, wheels W) through the differential body portion.

This allows the vehicle drive device 1 to transfer torque of at least one of the internal combustion engine E and the rotary electric machine MG to the wheels W to drive the vehicle. The internal combustion engine E transfers a drive force to the wheels W via the input shaft I, the engagement device CL, the intermediate shaft M, the speed change mechanism TM, the gear mechanism C, the differential gear device DF, and the output shafts O with the engagement device CL engaged. The rotary electric machine MG transfers a drive force to the wheels W via the intermediate shaft M, the speed change mechanism TM, the gear mechanism C, the differential gear device DF, and the output shafts O. In the embodiment, the rotary electric machine MG corresponds to the "wheel drive rotary electric machine" according to the present disclosure. In the embodiment, in this way, only one rotary electric machine MG for driving the wheels W that transfers a drive force to the output shafts O and the wheels W is provided. That is, the vehicle drive device 1 according to the embodiment includes a single rotary electric machine MG for driving wheels.

The vehicle drive device 1 includes a mechanical pump (not illustrated) drivably coupled to the intermediate shaft M so as to rotate together with the intermediate shaft M. The mechanical pump discharges oil using torque of at least one of the internal combustion engine E and the rotary electric machine MG with at least one of the internal combustion engine E and the rotary electric machine MG rotating. In the embodiment, in addition, the vehicle drive device 1 also includes an electric pump EOP driven by a pump motor PM (also see FIG. 2) provided independently of the power transfer path which connects between the input shaft I and the output shafts O. The pump motor PM does not transfer a drive force to the wheels W, and thus could not be the "wheel drive rotary electric machine" according to the present disclosure. In other words, the presence of the pump motor PM does not affect the fact that the vehicle drive device 1 includes a "single" rotary electric machine MG for driving wheels.

The pump motor PM is electrically connected to the electricity accumulation device B via a second inverter 40. In the embodiment, in this way, the rotary electric machine MG which is controlled by the first inverter 30 and the pump motor PM which is controlled by the second inverter 40 are driven using the common electricity accumulation device B as the electric power source. A battery at a higher voltage (100 [V] or more) than an auxiliary battery (e.g. at 12 [V]) provided in the vehicle to serve as the electric power source for auxiliaries such as a compressor of an air conditioner and audio devices is used as the electricity accumulation device B. The pump motor PM may be driven using the low-voltage auxiliary battery as the electric power source.

The electric pump EOP discharges oil using torque of the pump motor PM with the pump motor PM rotating. Oil discharged from at least one of the mechanical pump and the electric pump EOP generates a hydraulic pressure to be supplied to a hydraulic servo mechanism (not illustrated) of the speed change mechanism TM to be used to control the state of engagement of the shifting engagement devices provided in the speed change mechanism TM. In addition, oil discharged from at least one of the mechanical pump and the electric pump EOP is also used to cool the rotary electric machine MG, lubricate various portions, and so forth. In the embodiment, with the provision of the electric pump EOP, oil can be supplied to the shifting engagement devices even when the internal combustion engine E is stationary to engage the shifting engagement devices to appropriately start the vehicle. The vehicle drive device 1 according to the embodiment may be suitably applied to a drive device for a hybrid vehicle having an idle stop function.

2. Structure for Fixing Inverter Device to Case

Figure 4:
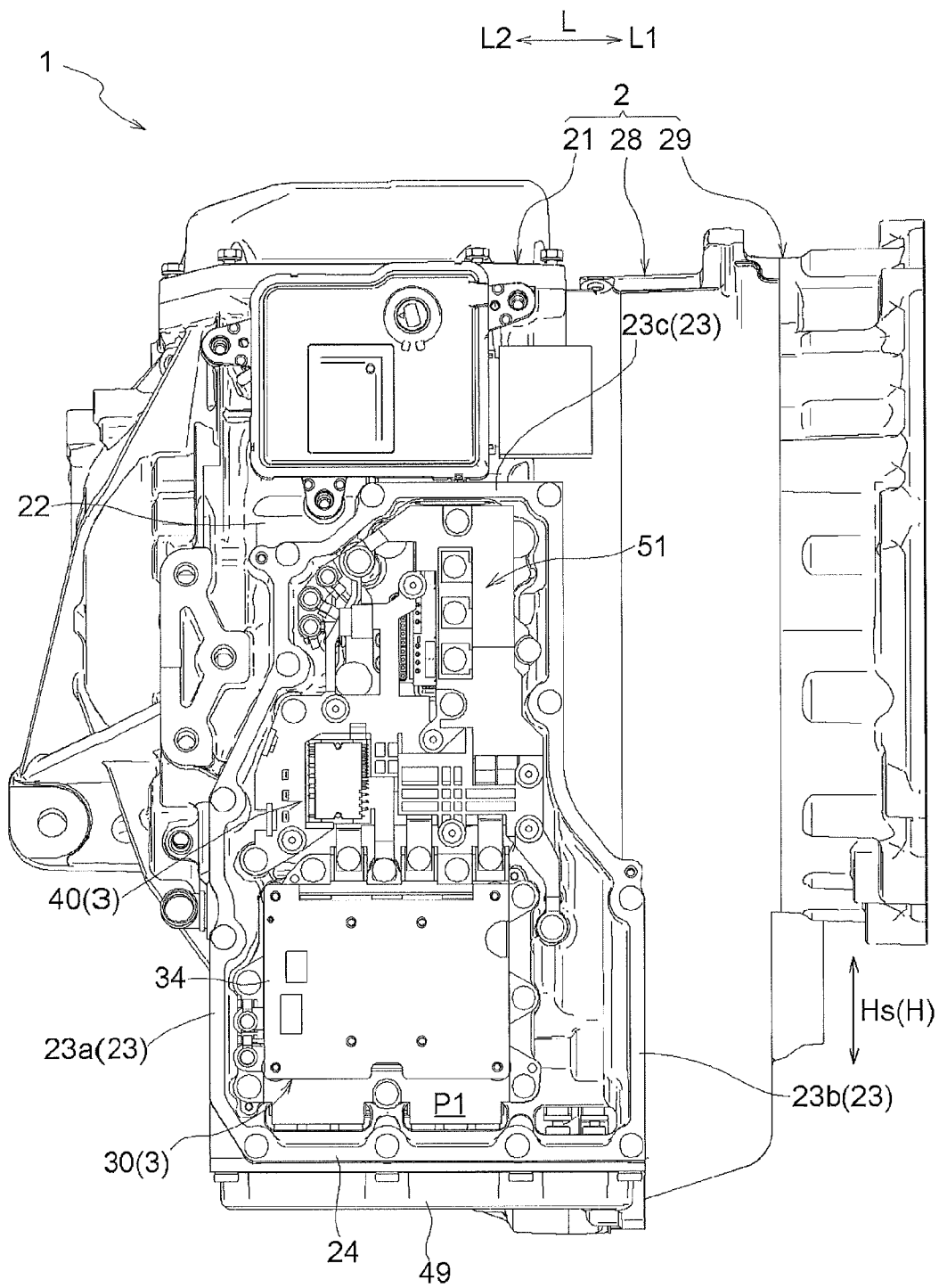
FIG. 4 illustrates the vehicle drive device as seen in the vertical direction.

In the embodiment, as illustrated in FIG. 4, the case 2 includes a first case portion 21 and a second case portion 28 formed to be split in the axial direction L. The first case portion 21 forms an accommodation space mainly for the speed change mechanism TM and the gear mechanism C. The second case portion 28 forms an accommodation space mainly for the rotary electric machine MG and the engagement device CL. A space obtained by adding the accommodation spaces for the speed change mechanism TM, the gear mechanism C, the rotary electric machine MG, and the engagement device CL is a closed space (see FIG. 6) formed oil-tightly in the case 2. In the embodiment, the closed space is referred to as a "drive element accommodation chamber Q". In the embodiment, an accommodation space for the differential gear device DF is formed to extend between the first case portion 21 and the second case portion 28 (also see FIG. 5). The second case portion 28 is joined to the first case portion 21 from the side in the first axial direction L1.

Figure 6:
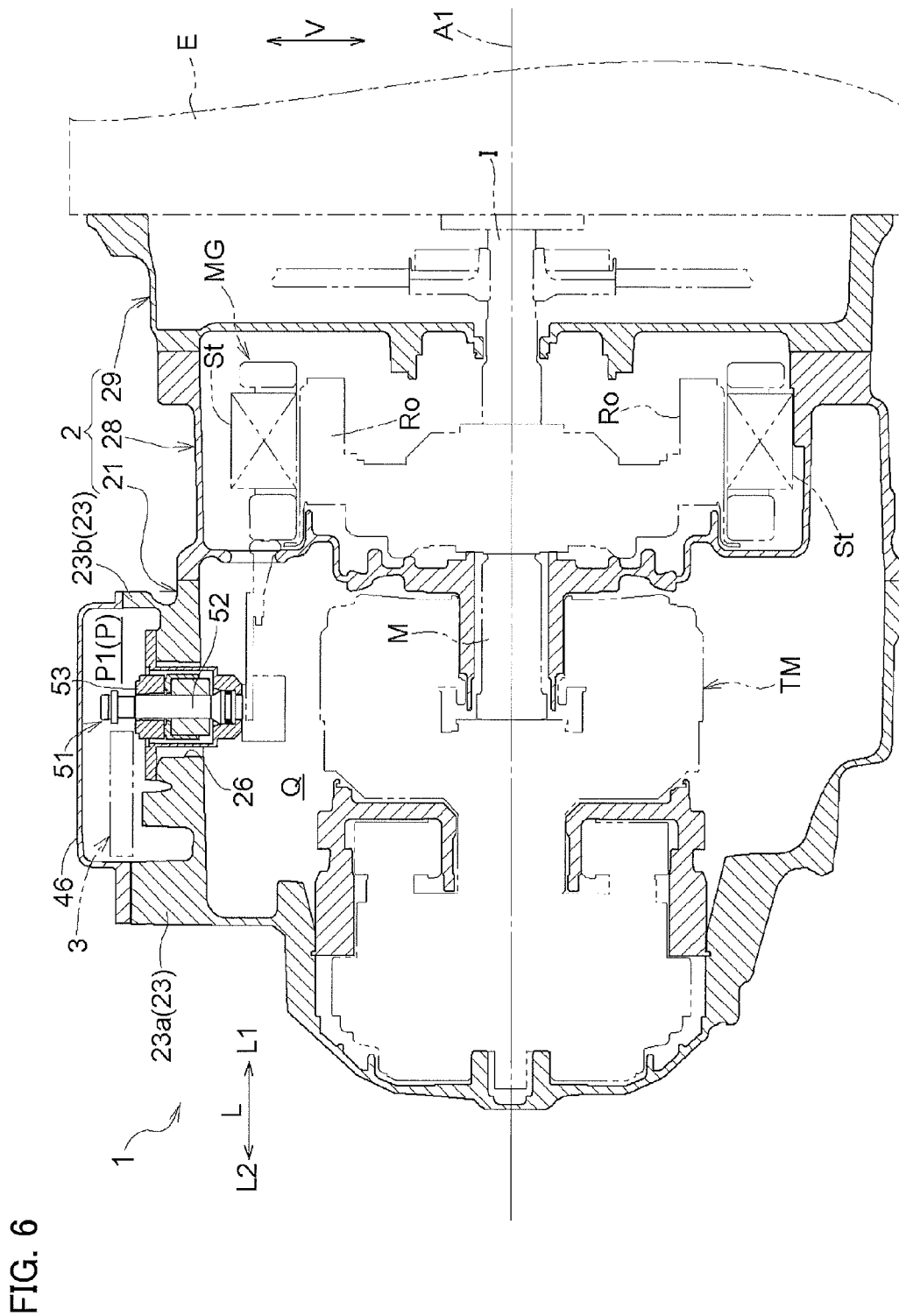
FIG. 6 is a schematic view illustrating the arrangement relationship of constituent parts as seen in a particular horizontal direction.

In the example, in addition, the vehicle drive device 1 includes a damper, and a third case portion 29 that forms an accommodation space for the damper is joined to the second case portion 28 from the side in the first axial direction L1. In this way, the third case portion 29, the second case portion 28, and the first case portion 21 are disposed such that the distance of spacing from the internal combustion engine E along the axial direction L becomes longer in the order in which they are mentioned. As illustrated in FIG. 6, the third case portion 29 is formed to be larger in the radial direction than the first case portion 21 and the second case portion 28 which compose the case 2. In the embodiment, the third case portion 29 corresponds to the "damper accommodation case portion" according to the present disclosure.

As illustrated in FIG. 2, an inverter device 3 that performs conversion between DC power and AC power is integrally attached to the case 2. In the embodiment, the inverter device 3 includes the first inverter 30 which controls the rotary electric machine MG and the second inverter 40 which controls the pump motor PM. The inverter device 3 is integrally fixed to the case 2 directly, not via an inverter case that accommodates the inverter device 3 or the like. That is, the vehicle drive device 1 according to the embodiment adopts an inverter case-less structure.

In the embodiment, as illustrated in FIGS. 4 and 6, the inverter device 3 is fixed to the first case portion 21 which accommodates the speed change mechanism TM etc., not to the second case portion 28 which accommodates the rotary electric machine MG etc. In the embodiment, in order to suppress the length of the entire device in the axial direction L to be short, the rotary electric machine MG which is large in diameter and thin is used. Therefore, the speed change mechanism TM is shaped to be smaller in diameter and longer in the axial direction L than the rotary electric machine MG. Consequently, an annular space having an axial length matching the length of the speed change mechanism TM in the axial direction L is formed on the radially outer side of the speed change mechanism TM because of the difference between the outside diameter of the rotary electric machine MG and the outside diameter of the speed change mechanism TM. Thus, the entire vehicle drive device 1 including the integrated inverter device 3 can be downsized by disposing the inverter device 3 effectively utilizing at least a part of the annular space. In addition, the inverter device 3 is fixed to the first case portion 21 which is disposed opposite to the internal combustion engine E with respect to the second case portion 28. By disposing the inverter device 3 with more spacing from the internal combustion engine E in this way, it is possible to prevent radiant heat from the internal combustion engine E from reaching the inverter device 3.

The first inverter 30 is electrically connected to the rotary electric machine MG and the electricity accumulation device B (see FIG. 1), and coordinates exchange of electric power between the electricity accumulation device B and the rotary electric machine MG in accordance with a control command from a control device (drive device control device). In the embodiment, the first inverter 30 converts electric power between DC power exchanged with the electricity accumulation device B and AC power (three-phase AC power) exchanged with the rotary electric machine MG. To this end, the first inverter 30 includes a plurality of switching elements 33 for DC/AC conversion.

Figure 3:
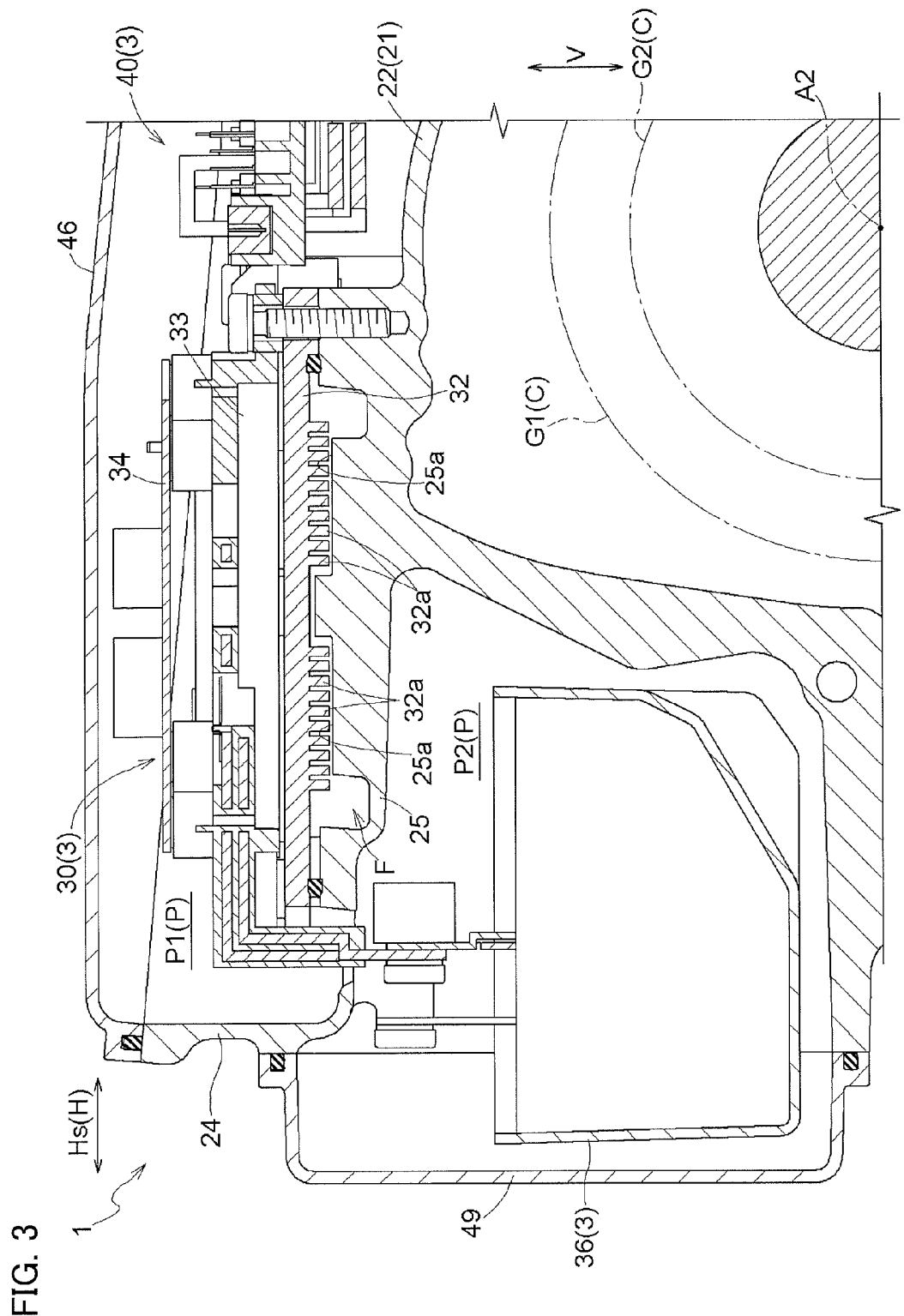
FIG. 3 is a partial enlarged view of FIG. 2.

As illustrated in FIG. 3, the first inverter 30 includes a base plate 32 in a flat shape, and the plurality of switching elements 33 are fixed to the base plate 32. The base plate 32 is constituted of a highly thermally conductive material (e.g. a metal material such as copper or aluminum), and also functions as a heat sink. IGBTs, MOSFETs, and so forth, for example, may be used as the switching elements 33. The first inverter 30 may include a rectifier element constituted from a diode or the like, for example, and the rectifier element may be connected in parallel with the switching elements 33.

Fins 32a are formed on a surface (non-element disposed surface) of the base plate 32 that is opposite to a surface (element disposed surface) on which the switching elements 33 are disposed. The fins 32a are formed to stand upright along the direction of the normal to the base plate 32. The fins 32a may have various shapes such as a plate shape and a pin shape. In addition, a control substrate 34 that controls switching of the switching elements 33 is fixed to the base plate 32. The control substrate 34 is disposed in parallel with the base plate 32 on the side opposite to the base plate 32 with respect to the switching elements 33. The first inverter 30 is formed in a flat rectangular parallelepiped shape as a whole.

As illustrated in FIG. 1, the second inverter 40 is electrically connected to the pump motor PM and the electricity accumulation device B, and coordinates exchange of electric power between the electricity accumulation device B and the pump motor PM in accordance with a control command from the control device (drive device control device). In the embodiment, the second inverter 40 converts electric power between DC power exchanged with the electricity accumulation device B and AC power (three-phase AC power) exchanged with the pump motor PM. To this end, the second inverter 40 includes a plurality of switching elements for DC/AC conversion. In addition, the second inverter 40 includes a control substrate that controls the switching elements. In the embodiment, the switching elements are integrated on the control substrate to constitute the second inverter 40. As with the first inverter 30, the second inverter 40 is also formed to be flat as a whole (also see FIG. 2).

The inverter device 3 includes a smoothing capacitor 36 electrically connected to the first inverter 30 and the second inverter 40. The smoothing capacitor 36 smoothes (suppresses fluctuations in) DC power exchanged between the electricity accumulation device B and the first inverter 30 and the second inverter 40. A film capacitor made from a synthetic resin, a ceramic capacitor made from an inorganic material, or the like may be used as the smoothing capacitor 36. Such a smoothing capacitor 36 has a relatively large degree of freedom in design in terms of the size and the shape, and can be adjusted in accordance with the size and the shape of the space in which the smoothing capacitor 36 is disposed. In the example, the smoothing capacitor 36 is formed in the shape of a rectangular parallelepiped (block) with low flatness compared to the first inverter 30 and the second inverter 40.

Figure 5:
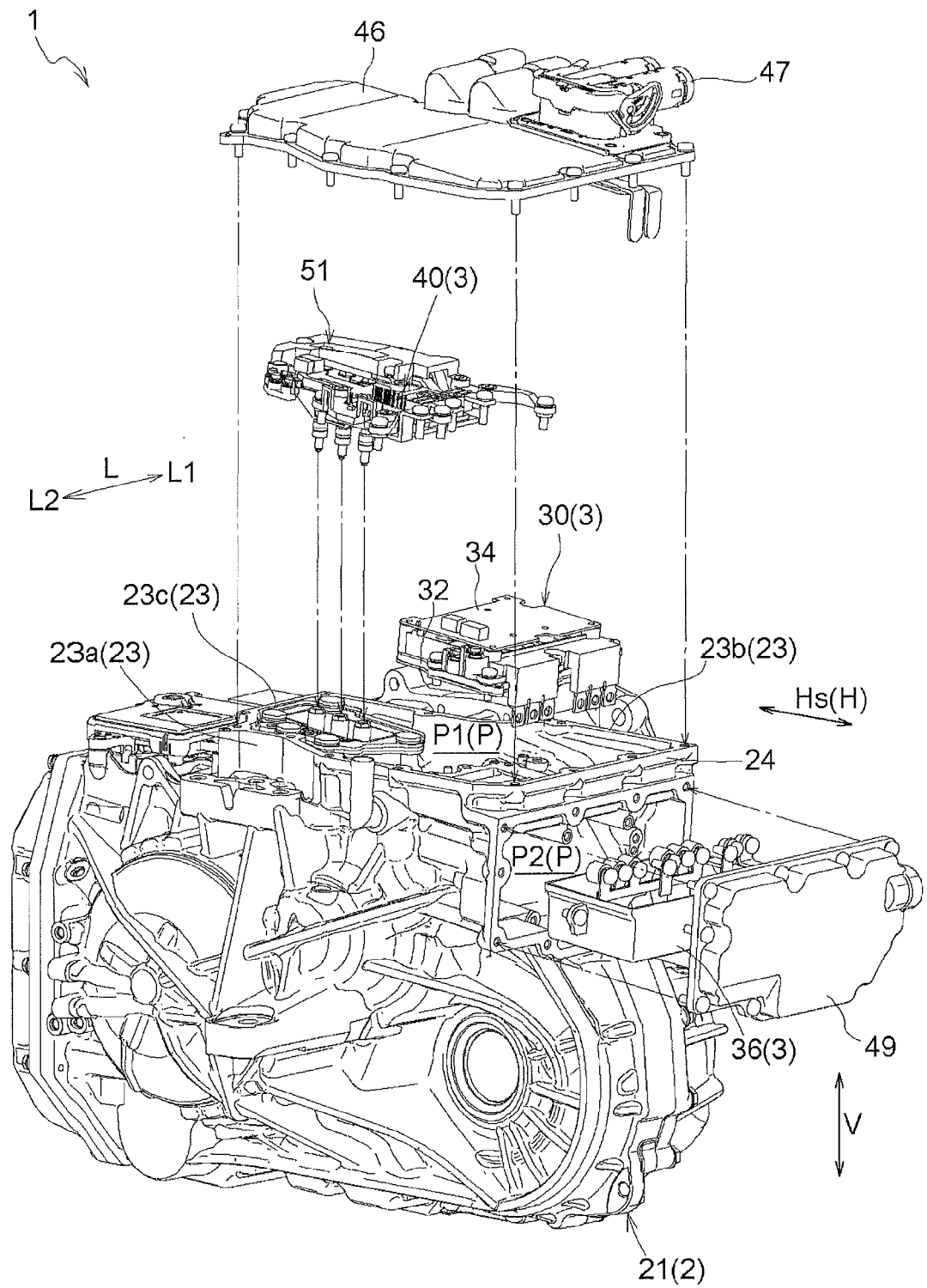
FIG. 5 is an exploded perspective view of the vehicle drive device.

As illustrated in FIG. 5, the first inverter 30 and the second inverter 40 and the smoothing capacitor 36 are fixed at different positions in the outer peripheral portion (specifically, a region along an outer peripheral wall 22) of the first case portion 21. The outer peripheral wall 22 is formed in the shape of an oddly shaped tube along the outer shape of the speed change mechanism TM, the gear mechanism C, and the differential gear device DF which are constituent parts with the three axes as seen in the axial direction L. The first case portion 21 includes a projecting wall 23 that projects toward the outer side (in the example, mainly vertically upward) from the outer peripheral wall 22. As illustrated in FIGS. 4 and 5, the projecting wall 23 includes a pair of opposing wall portions 23a and 23b disposed to extend in a direction that crosses the axial direction L at different positions in the axial direction L so as to oppose each other, and a coupling wall portion 23c that connects between respective end portions of the opposing wall portions 23a and 23b on one side. The opposing wall portions 23a and 23b and the coupling wall portion 23c are formed integrally with each other. The opposing wall portions 23a and 23b are formed to cover the entire region occupied by the three axes A1, A2, and A3 in a particular horizontal direction Hs (see FIG. 2). As illustrated in FIG. 2 etc., the particular horizontal direction Hs is a horizontal direction H that is orthogonal to the axial direction L. The coupling wall portion 23c is disposed on the side opposite to the third axis A3 with respect to the first axis A1 in the particular horizontal direction Hs.

The projection height of the opposing wall portions 23a and 23b from the outer peripheral wall 22 along the vertical direction V is different in accordance with the position in the particular horizontal direction Hs (see FIG. 5). The opposing wall portions 23a and 23b and the coupling wall portion 23c are formed such that the upper end portions (upper surfaces) thereof extend along the horizontal direction H. The projection height of such wall portions is suppressed to be relatively low, and is about the same as the height of the first inverter 30 and the second inverter 40 in a region corresponding to the gear mechanism C on the second axis A2, which is at the highest position among the three axes.

As illustrated in FIGS. 4 and 5, the first case portion 21 includes a beam portion 24 in the shape of a column or a plate formed at distal end portions (vertically upper end portions), in the direction of projection, of respective end portions of the pair of opposing wall portions 23a and 23b that are opposite to the coupling wall portion 23c to connect between the pair of opposing wall portions 23a and 23b. The opposing wall portions 23a and 23b and the beam portion 24 are formed integrally with each other. The projecting wall 23 and the beam portion 24 are formed such that the upper end portions (upper surfaces) thereof extend along the horizontal direction H. In addition, such components are formed such that side surfaces thereof on the outer side in the particular horizontal direction Hs extend along the vertical direction V.

As illustrated in FIGS. 2 and 3, the first case portion 21 includes a separation wall 25 that projects outward (in the example, mainly outward in the particular horizontal direction Hs) from the highest position of the outer peripheral wall 22 in the vicinity of an accommodation portion for the gear mechanism C. The separation wall 25 has a predetermined thickness, and is formed in the shape of a thick plate that extends along the horizontal direction H. The separation wall 25 is formed to extend along the particular horizontal direction Hs to a position at which the separation wall 25 opposes the beam portion 24 via a predetermined gap. Such a separation wall 25 separates a space defined in a region over which the pair of opposing wall portions 23a and 23b oppose each other along the outer peripheral wall 22 of the first case portion 21 into two spaces.

The two spaces formed along the outer peripheral wall 22 of the first case portion 21 are a first accommodation portion P1 that accommodates the first inverter 30 and the second inverter 40 and a second accommodation portion P2 that accommodates the smoothing capacitor 36. That is, the first case portion 21 has, in the outer peripheral portion thereof, the first accommodation portion P1 which accommodates the first inverter 30 and the second inverter 40 and the second accommodation portion P2 which accommodates the smoothing capacitor 36. The separation wall 25 described earlier may also be considered as separating between the first accommodation portion P1 and the second accommodation portion P2. As illustrated in FIG. 4, the first inverter 30 and the second inverter 40 are disposed adjacent to each other in the particular horizontal direction Hs in the first accommodation portion P1. In the example, the first inverter 30 is disposed in a wide region on the beam portion 24 side, and the second inverter 40 which is smaller than the first inverter 30 is disposed in a narrow region on the coupling wall portion 23c side.

In the embodiment, a space obtained by adding the two spaces defined by the first accommodation portion P1 and the second accommodation portion P2 is referred to as a "control element accommodation chamber P". As illustrated in FIG. 6, the control element accommodation chamber P and the drive element accommodation chamber Q discussed above communicate with each other via a communication hole 26 formed in the outer peripheral wall 22 of the first case portion 21. In the example, the control element accommodation chamber P and the drive element accommodation chamber Q communicate with each other via only the communication hole 26, and are completely separated from each other at portions other than the communication hole 26.

The separation wall 25 includes recessed portions 25a formed to be dented in a recessed shape in a surface on the first accommodation portion P1 side. The first inverter 30 (specifically, the base plate 32) is fixed to the separation wall 25 with the fins 32a accommodated in the recessed portions 25a. The separation wall 25 and the base plate 32 are joined to each other in a liquid-tight manner with a seal member or the like interposed therebetween, for example. A space defined by the recessed portions 25a between the separation wall 25 and the base plate 32 functions as a cooling water path F that allows circulation of cooling water (an example of a cooling liquid). In the embodiment, in this way, the cooling water path F is formed in the separation wall 25 which separates between the first accommodation portion P1 and the second accommodation portion P2. The cooling water path F is formed along the first inverter 30. In addition, the cooling water path F is disposed on the speed change mechanism TM side (gear mechanism C side) with respect to the first inverter 30.

Cooling water introduced into the cooling water path F passes between the fins 32a to be circulated. In this event, the switching elements 33 are cooled through heat exchange via the base plate 32. Consequently, the switching elements 33 which generate heat along with switching operation can be effectively cooled. In the structure according to the embodiment, in addition, the cooling water path F is interposed between the first inverter 30 and drive device constituent parts such as the speed change mechanism TM and the gear mechanism C. Therefore, the first inverter 30 can be thermally shielded from the drive device constituent parts which tend to be relatively hot. Hence, the first inverter 30 (switching elements 33) can be effectively thermally protected.

As illustrated in FIGS. 4 and 5, the upper surfaces of the projecting wall 23 (the pair of opposing wall portions 23a and 23b and the coupling wall portion 23c) and the beam portion 24 which are integrated are formed in a frame shape as seen in the vertical direction V in the vehicle mounted state. The first accommodation portion P1 is formed in a space inside the frame shape. In addition, the side surfaces of the projecting wall 23 (pair of opposing wall portions 23a and 23b) and the beam portion 24 which are integrated are formed in a frame shape also utilizing a part of the outer peripheral wall 22 as seen in the particular horizontal direction Hs in the vehicle mounted state. The second accommodation portion P2 is formed in a space inside the frame shape. The first accommodation portion P1 and the second accommodation portion P2 open toward the outside of the first case portion 21 and in different directions. Specifically, in the vehicle mounted state, the first accommodation portion P1 opens upward, and the second accommodation portion P2 opens laterally (along the particular horizontal direction Hs).

The first inverter 30 and the second inverter 40 can be inserted into the first accommodation portion P1 in the vertical direction V to be fixed to the first case portion 21. The smoothing capacitor 36 can be inserted into the second accommodation portion P2 in the particular horizontal direction Hs to be fixed to the first case portion 21. The first inverter 30 and the second inverter 40 and the smoothing capacitor 36 can be fixed to the first case portion 21 through independent processes. With the first inverter 30, the second inverter 40, and the smoothing capacitor 36 fixed to the first case portion 21, a first cover 46 is attached so as to block an opening portion in the vertical direction V, and a second cover 49 is attached so as to block an opening portion in the particular horizontal direction Hs. The first cover 46 is provided with a power source connector 47 to which a wiring member that extends from the electricity accumulation device B is connected.

The first inverter 30, the second inverter 40, and the smoothing capacitor 36 which compose the inverter device 3 are electrically connected to each other using an electrical connection member such as a bus bar. In the embodiment, the first inverter 30 and the second inverter 40 are connected in parallel with the smoothing capacitor 36. That is, the first inverter 30 and the second inverter 40 share the single smoothing capacitor 36. The wiring member which extends from the electricity accumulation device B is connected to the power source connector 47 (see FIG. 5), and the power source connector 47 is connected to the smoothing capacitor 36 via a first bus bar. The first inverter 30 and the second inverter 40 which are connected to the smoothing capacitor 36 via a second bus bar (including a harness or the like as necessary) are connected to a terminal block 51 via a third bus bar and a fourth bus bar, respectively.

As illustrated in FIGS. 2 and 6, the terminal block 51 includes a plurality of relay terminals 52 and a holding block 53 that holds the relay terminals 52. The relay terminals 52 are constituted using a conductive material (in the example, a metal material), and the holding block 53 is constituted using an insulating material (in the example, a resin material). The plurality of relay terminals 52 are collectively held by the single holding block 53. The terminal block 51 (holding block 53) is disposed as fitted in the communication hole 26 formed in the first case portion 21. Consequently, the relay terminals 52 are disposed to be inserted through the communication hole 26 such that both end portions of the relay terminals 52 are positioned in the control element accommodation chamber P (first accommodation portion P1) and the drive element accommodation chamber Q. The bus bars which extend from the first inverter 30 and the second inverter 40 are connected to the corresponding relay terminals 52 in the control element accommodation chamber P (first accommodation portion P1). Further, the wiring members which extend from the rotary electric machine MG and the pump motor PM are connected to the relay terminals 52 in the drive element accommodation chamber Q. In this way, the inverter device 3 (the first inverter 30 and the second inverter 40) is electrically connected to the rotary electric machine MG and the pump motor PM via the terminal block 51 which includes the relay terminals 52.

3. Arrangement of Inverter Device

The inverter device 3 (the first inverter 30, the second inverter 40, and the smoothing capacitor 36) and the terminal block 51 are spatially (three-dimensionally) disposed as follows in relation to other drive device constituent parts. The arrangement of the constituent parts of the inverter device 3 and the terminal block 51 mainly as seen in the radial direction and as seen in the axial direction L will be described below. The arrangement of such components as seen in the axial direction L will be described particularly with focus on the relationship with seven reference planes composed of a first reference plane R1 to a seventh reference plane R7.

As can be understood from FIGS. 4 and 5, the first inverter 30 and the smoothing capacitor 36 have about the same axial dimension. The second inverter 40 and the terminal block 51 are disposed such that the second inverter 40 and the terminal block 51 are entirely accommodated in a region in the axial direction L occupied by the first inverter 30 and the smoothing capacitor 36. Consequently, such components are disposed at the same position in the axial direction L. As illustrated in FIG. 6, the inverter device 3 and the terminal block 51 are disposed so as to overlap the speed change mechanism TM and so as not to overlap the rotary electric machine MG as seen in the radial direction. In other words, the inverter device 3 and the terminal block 51 are disposed so as to axially overlap the speed change mechanism TM and so as not to axially overlap the rotary electric machine MG. That is, the inverter device 3 and the terminal block 51 are disposed on the radially outer side of the speed change mechanism TM which is smaller in diameter than the rotary electric machine MG, not on the radially outer side of the rotary electric machine MG. Among such components, the terminal block 51 is disposed so as to overlap the rotary electric machine MG (in the example, the stator St) as seen in the axial direction L. In other words, the terminal block 51 is disposed so as to radially overlap the rotary electric machine MG (in the example, the stator St). In addition, in the vehicle mounted state, the inverter device 3 is disposed such that the upper end portion of the inverter device 3 is positioned below the upper end portion of the third case portion 29. Although the upper end portion of the first cover 46 is positioned above the upper end portion of the third case portion 29 in the example, the amount of projection is suppressed to the necessary minimum.

Figure 7:
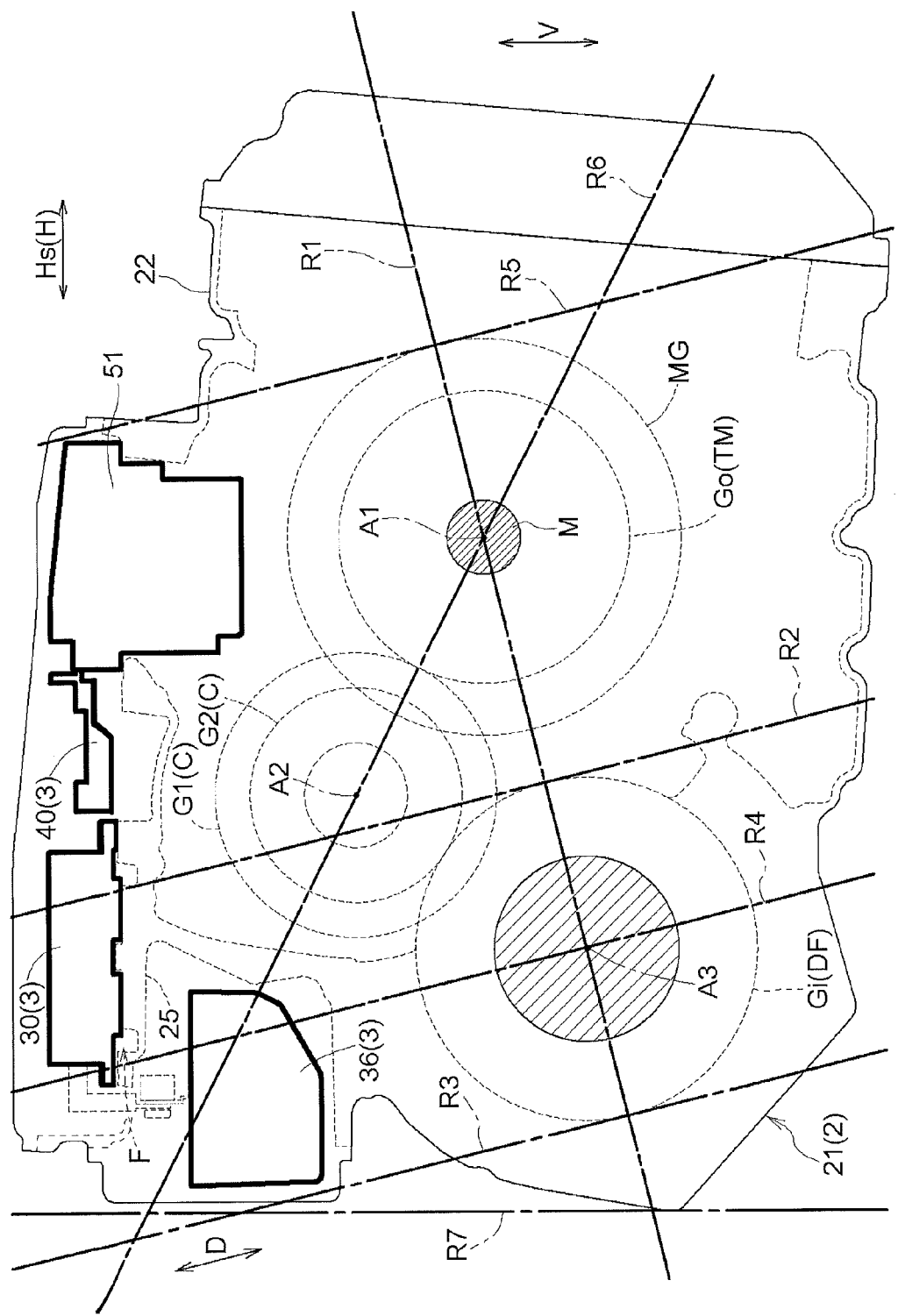
FIG. 7 is a schematic view illustrating the arrangement relationship of the constituent parts as seen in the axial direction.

As illustrated in FIG. 7, the first reference plane R1 is an imaginary plane that passes through the first axis A1 and the third axis A3. The second reference plane R2 and the third reference plane R3 are two imaginary planes that are orthogonal to the first reference plane R1 and that are tangent to a circle that circumscribes the differential input gear Gi of the differential gear device DF. One of such planes that is positioned on the first axis A1 side with respect to the third axis A3 is defined as the second reference plane R2, and the other that is positioned opposite to the first axis A1 side is defined as the third reference plane R3. The fourth reference plane R4 is an imaginary plane that is orthogonal to the first reference plane R1 and that passes through the third axis A3. The fifth reference plane R5 is an imaginary plane that is orthogonal to the first reference plane R1 and that is tangent to the rotary electric machine MG (stator St) on the side opposite to the third axis A3 with respect to the first axis A1. The sixth reference plane R6 is an imaginary plane that passes through the first axis A1 and the second axis A2. The seventh reference plane R7 is an imaginary plane that extends along the axial direction L and the vertical direction V and that is tangent to the outer edge of the first case portion 21 on the side opposite to the first axis A1 with respect to the third axis A3.

The smoothing capacitor 36 is disposed between the second reference plane R2 and the third reference plane R3 in a region opposite to the first reference plane R1 with respect to the second axis A2. In the embodiment, the smoothing capacitor 36 is further disposed between the second reference plane R2 and the seventh reference plane R7. The smoothing capacitor 36 is disposed so as to overlap the differential gear device DF as seen in a reference orthogonal direction D (direction that is orthogonal to the first reference plane R1). The smoothing capacitor 36 is further disposed so as to overlap the first inverter 30 and the cooling water path F as seen in the reference orthogonal direction D. In addition, the smoothing capacitor 36 is disposed so as to overlap the gear mechanism C as seen in a direction that is parallel to the first reference plane R1 and that is orthogonal to the axial direction L. The smoothing capacitor 36 is disposed so as to overlap the gear mechanism C also as seen in the particular horizontal direction Hs. Further, the smoothing capacitor 36 is disposed such that at least a part of the smoothing capacitor 36 is positioned vertically below the sixth reference plane R6.

In this way, the space inside the device can be effectively utilized by disposing the smoothing capacitor 36 in a region positioned both on the radially outer side of the gear mechanism C with reference to the second axis A2 and on the radially outer side of the differential gear device DF with reference to the third axis A3. In particular, the smoothing capacitor 36 has a relatively high degree of freedom in shape, and therefore it is easy to conform the outer shape of the smoothing capacitor 36 to the three-dimensional shape of a region on the outer side of both the gear mechanism C and the differential gear device DF. Hence, the entire vehicle drive device 1 including the inverter device 3 can be downsized by suppressing the occurrence of a dead space inside the device as much as possible.

The first inverter 30 is disposed between the second reference plane R2 and the fourth reference plane R4 in a region opposite to the first reference plane R1 with respect to the gear mechanism C. The first inverter 30 is disposed so as to overlap the differential gear device DF and the gear mechanism C as seen in the reference orthogonal direction D. Further, the first inverter 30 is disposed so as to overlap the smoothing capacitor 36 as seen in the reference orthogonal direction D. The first inverter 30 is disposed such that one of both end portions of the first inverter 30 in the particular horizontal direction Hs overlaps the gear mechanism C and the other end portion overlaps the smoothing capacitor 36 as seen in the reference orthogonal direction D.

The second inverter 40 is disposed between the second reference plane R2 and the fifth reference plane R5 in a region opposite to the first reference plane R1 with respect to the gear mechanism C. The second inverter 40 is disposed so as to overlap the gear mechanism C and the speed change mechanism TM as seen in the reference orthogonal direction D. In addition, the second inverter 40 is disposed so as to overlap the first inverter 30 and the terminal block 51 as seen in the particular horizontal direction Hs. The first inverter 30 and the second inverter 40 which are adjacent to each other along the particular horizontal direction Hs are disposed in a region that occupies substantially the same position in the vertical direction V.

The terminal block 51 is disposed between the second reference plane R2 and the fifth reference plane R5 in a region opposite to the first reference plane R1 with respect to the second axis A2. The terminal block 51 is disposed so as to overlap the speed change mechanism TM as seen in the reference orthogonal direction D. The terminal block 51 is disposed so as to overlap the speed change mechanism TM also as seen in the vertical direction V. In other words, the terminal block 51 is disposed so as to horizontally overlap the speed change mechanism TM. The terminal block 51 is disposed in a lower region including the same position in the vertical direction V with respect to the second inverter 40 which is disposed adjacent to the terminal block 51 in the particular horizontal direction Hs. In addition, the terminal block 51 is disposed so as to overlap the smoothing capacitor 36 and the gear mechanism C as seen in a direction that is parallel to the first reference plane R1 and that is orthogonal to the axial direction L. The terminal block 51 is disposed so as to overlap the smoothing capacitor 36 and the gear mechanism C also as seen in the particular horizontal direction Hs. In other words, the terminal block 51 is disposed so as to vertically overlap the smoothing capacitor 36 and the gear mechanism C.

The terminal block 51 includes the relay terminals 52 which have a certain length for insertion through the communication hole 26 formed in the first case portion 21. Thus, the terminal block 51 tends to be formed in the shape of a rectangular parallelepiped (block) with low flatness compared to the first inverter 30 and the second inverter 40. Also in this case, in the configuration according to the embodiment, the space inside the device can be effectively utilized by disposing the terminal block 51 in a region positioned both on the radially outer side of the gear mechanism C with reference to the second axis A2 and on the radially outer side of the speed change mechanism TM with reference to the first axis A1. Hence, the entire vehicle drive device 1 including the inverter device 3 can be downsized by suppressing the occurrence of a dead space inside the device as much as possible.

In the embodiment, in particular, the smoothing capacitor 36 and the terminal block 51, which are both formed in the shape of a rectangular parallelepiped (block), are disposed on both sides in the particular horizontal direction Hs with respect to the gear mechanism C which is at the highest position among the constituent parts with the three axes. Such components are both disposed so as to overlap the gear mechanism C as seen in the particular horizontal direction Hs. Hence, the smoothing capacitor 36 and the terminal block 51 which are in the shape of a rectangular parallelepiped (block) can be disposed compactly in a region on the radially outer side of the gear mechanism C with reference to the second axis A2.

In the embodiment, in this way, the first inverter 30, the second inverter 40, the smoothing capacitor 36, and the terminal block 51 are disposed so as to meet the specifications discussed above in consideration of the shape characteristics (such as the degree of freedom in shape and the flatness). Consequently, the entire vehicle drive device 1 including the first inverter 30 and the second inverter 40 which compose the inverter device 3 and the smoothing capacitor 36 and the terminal block 51 which are common to the first inverter 30 and the second inverter 40 is constituted in a horizontally long rectangular shape as seen in the axial direction L. Such components may have an aspect ratio of "5:4" to "3:2", for example. In the illustrated example, the aspect ratio is about "14:11". The constituent parts are disposed densely without interference in the horizontally long rectangular outer shape, which allows the entire vehicle drive device 1 including the inverter device 3 etc. to be effectively downsized. Hence, the vehicle drive device 1 can be fixed to the vehicle body while securing the minimum ground clearance, which secures good mountability of the vehicle drive device 1 on the vehicle.

4. Other Embodiments

Lastly, vehicle drive devices according to other embodiments of the present disclosure will be described. A configuration disclosed in each of the following embodiments may be applied in combination with a configuration disclosed in any other embodiment unless any contradiction occurs.

(1) In the embodiment described above, the terminal block 51 is disposed so as to overlap the speed change mechanism TM and so as not to overlap the rotary electric machine MG as seen in the radial direction. In addition, the terminal block 51 is disposed so as to overlap the rotary electric machine MG (only the stator St) as seen in the axial direction L. However, embodiments of the present disclosure are not limited thereto. For example, the terminal block 51 may be disposed so as to also overlap the MG as seen in the radial direction and so as not to overlap the MG as seen in the axial direction L. In addition, the terminal block 51 may be disposed so as to also overlap the rotor Ro in addition to the stator St as seen in the axial direction L. Depending on the shape of the terminal block 51, in addition, the terminal block 51 may be disposed so as to overlap the rotary electric machine MG as seen in the radial direction and the axial direction L.

(2) In the embodiment described above, the terminal block 51 is disposed so as to overlap the speed change mechanism TM as seen in the vertical direction V and so as to overlap the gear mechanism C as seen in the particular horizontal direction Hs. However, embodiments of the present disclosure are not limited thereto. For example, the terminal block 51 may be disposed so as not to overlap the speed change mechanism TM as seen in the vertical direction V. In addition, the terminal block 51 may be disposed so as not to overlap the gear mechanism C as seen in the particular horizontal direction Hs.

(3) In the embodiment described above, the entire inverter device 3 is disposed so as to be positioned below the upper end portion of the third case portion 29. In addition, the first cover 46 is disposed so as to project upward with respect to the upper end portion of the third case portion 29. However, embodiments of the present disclosure are not limited thereto. For example, not only the inverter device 3 but also the first cover 46 may be disposed so as not to project upward with respect to the upper end portion of the third case portion 29. This allows the entire vehicle drive device 1 to be further downsized. Alternatively, the inverter device 3 may be disposed so as to project upward with respect to the upper end portion of the third case portion 29.

(4) In the embodiment described above, the speed change mechanism TM is shaped to be smaller in diameter and longer in the axial direction L than the rotary electric machine MG. However, embodiments of the present disclosure are not limited thereto. The relationship in dimensions in the radial direction and the axial direction L between the rotary electric machine MG and the speed change mechanism TM may be set as desired. For example, the speed change mechanism TM may be about the same in outside diameter as the rotary electric machine MG, and may be larger in diameter than the rotary electric machine MG. In addition, the speed change mechanism TM may be about the same in axial length as the rotary electric machine MG, and may be shorter in axial length than the rotary electric machine MG.

(5) In the embodiment described above, the inverter device 3 is fixed to the first case portion 21 which accommodates the speed change mechanism TM etc. However, embodiments of the present disclosure are not limited thereto. For example, the inverter device 3 may be fixed to both the first case portion 21 and the second case portion 28 which accommodates the rotary electric machine MG etc. on condition that the inverter device 3 is disposed so as not to overlap the rotary electric machine MG as seen in the radial direction.

(6) Also regarding other configurations, the embodiments disclosed herein are illustrative in all respects, and it should be understood that the scope of the present disclosure is not limited thereto. It would be easy for a person skilled in the art to understand that the present disclosure may be altered as appropriate without departing from the scope and spirit of the present disclosure. Thus, it is a matter of course that other embodiments obtained by altering the present disclosure without departing from the scope and spirit of the present disclosure are also included in the scope of the present disclosure.

INDUSTRIAL APPLICABILITY

The present disclosure may be applied to a drive device for a hybrid vehicle.

The invention claimed is:
1. A vehicle drive device comprising:
an input member drivably coupled to an internal combustion engine;
an output member drivably coupled to wheels;
a single wheel drive rotary electric machine that transfers a drive force to the output member;
a speed change mechanism provided in a power transfer path that connects between the wheel drive rotary electric machine and the output member; and
an inverter device that controls the wheel drive rotary electric machine, wherein
the input member, the wheel drive rotary electric machine, and the speed change mechanism are disposed coaxially and side by side in an axial direction; and
the inverter device is disposed so as to axially overlap the speed change mechanism and so as not to axially overlap the wheel drive rotary electric machine.

2. The vehicle drive device according to claim 1, wherein
the speed change mechanism is formed to be smaller in the radial direction than the wheel drive rotary electric machine; and
the inverter device is disposed on an outer side in the radial direction with respect to the speed change mechanism.

3. The vehicle drive device according to claim 2, further comprising:
a terminal block that includes a relay terminal for electrical connection between the inverter device and the wheel drive rotary electric machine, wherein
the terminal block is disposed so as to axially overlap the speed change mechanism and so as to radially overlap the wheel drive rotary electric machine.

4. The vehicle drive device according to claim 3, wherein
the speed change mechanism is formed to be larger in length in the axial direction than the wheel drive rotary electric machine.

5. The vehicle drive device according to claim 3, further comprising:
a differential gear device provided in the power transfer path to distribute a drive force transferred from a side of the speed change mechanism to a plurality of output members; and
a gear mechanism provided in the power transfer path and interposed between the speed change mechanism and the differential gear device, wherein
a rotational axis of the speed change mechanism, a rotational axis of the gear mechanism which is parallel to the axial direction, and a rotational axis of the differential gear device which is parallel to the axial direction are disposed at vertexes of a triangle;
in a vehicle mounted state, the gear mechanism is disposed such that an upper end portion of the gear mechanism is positioned above an upper end portion of the speed change mechanism; and
in the vehicle mounted state, the terminal block is disposed so as to horizontally overlap the speed change mechanism and so as to vertically overlap the gear mechanism.

6. The vehicle drive device according to claim 4, wherein the inverter device includes at least a plurality of switching elements for DC/AC conversion.

7. The vehicle drive device according to claim 6, further comprising:
a case that accommodates the wheel drive rotary electric machine and the speed change mechanism, wherein:
a damper accommodation case portion that accommodates a damper and that is formed to be larger in the radial direction than the case is provided between the case and the internal combustion engine; and in the vehicle mounted state, the inverter device is disposed such that an upper end portion of the inverter device is positioned below an upper end portion of the damper accommodation case portion.

8. The vehicle drive device according to claim 1, further comprising:
a terminal block that includes a relay terminal for electrical connection between the inverter device and the wheel drive rotary electric machine, wherein
the terminal block is disposed so as to axially overlap the speed change mechanism and so as to radially overlap the wheel drive rotary electric machine.

9. The vehicle drive device according to claim 1, wherein
the speed change mechanism is formed to be larger in length in the axial direction than the wheel drive rotary electric machine.

10. The vehicle drive device according to claim 1, wherein
the inverter device includes at least a plurality of switching elements for DC/AC conversion.

11. The vehicle drive device according to claim 1, further comprising:
a case that accommodates the wheel drive rotary electric machine and the speed change mechanism, wherein:
a damper accommodation case portion that accommodates a damper and that is formed to be larger in the radial direction than the case is provided between the case and the internal combustion engine; and
in the vehicle mounted state, the inverter device is disposed such that an upper end portion of the inverter device is positioned below an upper end portion of the damper accommodation case portion.

12. The vehicle drive device according to claim 2, wherein
the speed change mechanism is formed to be larger in length in the axial direction than the wheel drive rotary electric machine.

13. The vehicle drive device according to claim 2, wherein
the inverter device includes at least a plurality of switching elements for DC/AC conversion.

14. The vehicle drive device according to claim 2, further comprising:
a case that accommodates the wheel drive rotary electric machine and the speed change mechanism, wherein:
a damper accommodation case portion that accommodates a damper and that is formed to be larger in the radial direction than the case is provided between the case and the internal combustion engine; and
in the vehicle mounted state, the inverter device is disposed such that an upper end portion of the inverter device is positioned below an upper end portion of the damper accommodation case portion.

15. The vehicle drive device according to claim 8, wherein
the speed change mechanism is formed to be larger in length in the axial direction than the wheel drive rotary electric machine.

16. The vehicle drive device according to claim 8, further comprising:
a differential gear device provided in the power transfer path to distribute a drive force transferred from a side of the speed change mechanism to a plurality of output members; and
a gear mechanism provided in the power transfer path and interposed between the speed change mechanism and the differential gear device, wherein
a rotational axis of the speed change mechanism, a rotational axis of the gear mechanism which is parallel to the axial direction, and a rotational axis of the differential gear device which is parallel to the axial direction are disposed at vertexes of a triangle;
in a vehicle mounted state, the gear mechanism is disposed such that an upper end portion of the gear mechanism is positioned above an upper end portion of the speed change mechanism; and
in the vehicle mounted state, the terminal block is disposed so as to horizontally overlap the speed change mechanism and so as to vertically overlap the gear mechanism.

17. The vehicle drive device according to claim 8, wherein
the inverter device includes at least a plurality of switching elements for DC/AC conversion.

18. The vehicle drive device according to claim 8, further comprising:
a case that accommodates the wheel drive rotary electric machine and the speed change mechanism, wherein:
a damper accommodation case portion that accommodates a damper and that is formed to be larger in the radial direction than the case is provided between the case and the internal combustion engine; and
in the vehicle mounted state, the inverter device is disposed such that an upper end portion of the inverter device is positioned below an upper end portion of the damper accommodation case portion.

19. The vehicle drive device according to claim 9, wherein
the inverter device includes at least a plurality of switching elements for DC/AC conversion.

20. The vehicle drive device according to claim 9, further comprising:
a case that accommodates the wheel drive rotary electric machine and the speed change mechanism, wherein:
a damper accommodation case portion that accommodates a damper and that is formed to be larger in the radial direction than the case is provided between the case and the internal combustion engine; and
in the vehicle mounted state, the inverter device is disposed such that an upper end portion of the inverter device is positioned below an upper end portion of the damper accommodation case portion.

* * * * *